United States Patent
Varma et al.

(10) Patent No.: US 8,520,590 B1
(45) Date of Patent: Aug. 27, 2013

(54) EFFICIENT IN-BAND BACKHAUL

(75) Inventors: Subir Varma, San Jose, CA (US); Mohan R. Tammisetti, South Riding, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 939 days.

(21) Appl. No.: 12/248,707

(22) Filed: Oct. 9, 2008

(51) Int. Cl.
*G01R 31/08* (2006.01)
*G06F 11/00* (2006.01)
*G08C 15/00* (2006.01)
*H04J 1/16* (2006.01)
*H04J 1/00* (2006.01)
*H04J 3/08* (2006.01)
*H04L 1/00* (2006.01)
*H04B 7/14* (2006.01)
*H04W 4/00* (2009.01)

(52) U.S. Cl.
USPC .......................... 370/328; 370/235; 370/315

(58) Field of Classification Search
USPC ......................................................... 370/328
See application file for complete search history.

(56) References Cited

U.S. PATENT DOCUMENTS

| | | | | |
|---|---|---|---|---|
| 7,630,402 B2 * | 12/2009 | Un et al. | | 370/469 |
| 2004/0062214 A1 * | 4/2004 | Schnack et al. | | 370/315 |
| 2007/0109962 A1 * | 5/2007 | Leng et al. | | 370/229 |
| 2007/0110005 A1 * | 5/2007 | Jin et al. | | 370/335 |
| 2007/0265013 A1 | 11/2007 | Labedz | | |
| 2008/0004029 A1 | 1/2008 | Moilanen | | |
| 2008/0090575 A1 * | 4/2008 | Barak et al. | | 455/444 |
| 2008/0285473 A1 * | 11/2008 | Chen et al. | | 370/252 |
| 2009/0029645 A1 * | 1/2009 | Leroudier | | 455/7 |

OTHER PUBLICATIONS

"Overview of WiMAX," Fundamentals of WiMAX: Understanding Broadband Wireless Networking, 2006, pp. 33-63, Chapter 2, Prentice Hall, Indianapolis, Indiana.

* cited by examiner

*Primary Examiner* — Derrick Ferris
*Assistant Examiner* — Kodzovi Acolatse
(74) *Attorney, Agent, or Firm* — O'Brien Jones, PLLC

(57) ABSTRACT

A first service flow and a second service flow are combined into a backhaul service flow. One or more data structures within a first downlink frame are defined. The first downlink frame comprises an access region and a backhaul region. The one or more data structures are in the backhaul region. The one or more data structures are also defined within a second downlink frame. The second downlink frame comprises the access region and the backhaul region and the one or more data structures are in the backhaul region. The backhaul service flow is distributed into the one or more data structures. The first downlink frame and the second downlink frame are sent. The first downlink frame and the second downlink frame comprise an access map and a backhaul map. The access map has a size that is larger than the backhaul map.

15 Claims, 6 Drawing Sheets

US 8,520,590 B1

EFFICIENT IN-BAND BACKHAUL

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known a long term evolution (LTE). Additional standards such as the fourth generation communication system (4G) are also being pursued.

All of these standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network including processes for registering on the network, carrier modulation, frequency bands of operation, and message formats.

Overview

A method of operating a media access control (MAC) layer for in-band backhaul of wireless communication is disclosed. A first service flow and a second service flow are combined into a backhaul service flow. One or more data structures within a first downlink frame are defined. The first downlink frame comprises an access region and a backhaul region. The one or more data structures are in the backhaul region. The one or more data structures are also defined within a second downlink frame. The second downlink frame comprises the access region and the backhaul region. The one or more data structures defined in the second downlink frame are in the backhaul region. The backhaul service flow is distributed into the one or more data structures. The first downlink frame and the second downlink frame are sent. The first downlink frame and the second downlink frame comprise an access map and a backhaul map. The access map has a first size. The backhaul map has a second size. The second size is smaller than the first size.

A system for in-band backhaul of wireless communication is disclosed. A wireless base station transmits a first downlink frame and a second downlink frame. The first downlink frame comprises an access region and a backhaul region. There are one or more data structures defined in the backhaul region. The second downlink frame also comprises the access region and the backhaul region. The one or more data structures in the second downlink frame are defined in the backhaul region. The wireless base station receives a first service flow and a second service and combines the first service flow and the second service flow into a backhaul service flow. The wireless base station distributes the backhaul service flow into the one or more data structures. The wireless base station sends the first downlink frame and the second downlink frame to a second base station. The first downlink frame and the second downlink frame comprise an access map and a backhaul map. The access map has a first size. The backhaul map has a second size. The second size is smaller than the first size.

A method of operating a wireless communication system is disclosed. A first set of packets directed to a wireless in-band backhaul link from wireless access link is received. A second set of packets directed to the wireless access link from the wireless in-band backhaul link is received. One or more fixed size backhaul bursts is defined within a backhaul region of a plurality of downlink frames. The plurality of downlink frames comprise an access region and the backhaul region. One or more access bursts are defined within the access region. The second set of packets is distributed to the one or more access bursts. The first set of packets is distributed to the one or more fixed size backhaul bursts. All of the plurality of downlink frames are wirelessly transmitted consecutively without changing a size or a position of each of the one or more fixed size backhaul bursts. The plurality of downlink frames comprise an access map having a first size and a backhaul map having a second size that is less than the first size. The access map is defined within the access region. The backhaul map is defined within the backhaul region.

DETAILED DESCRIPTION

Figure 1:
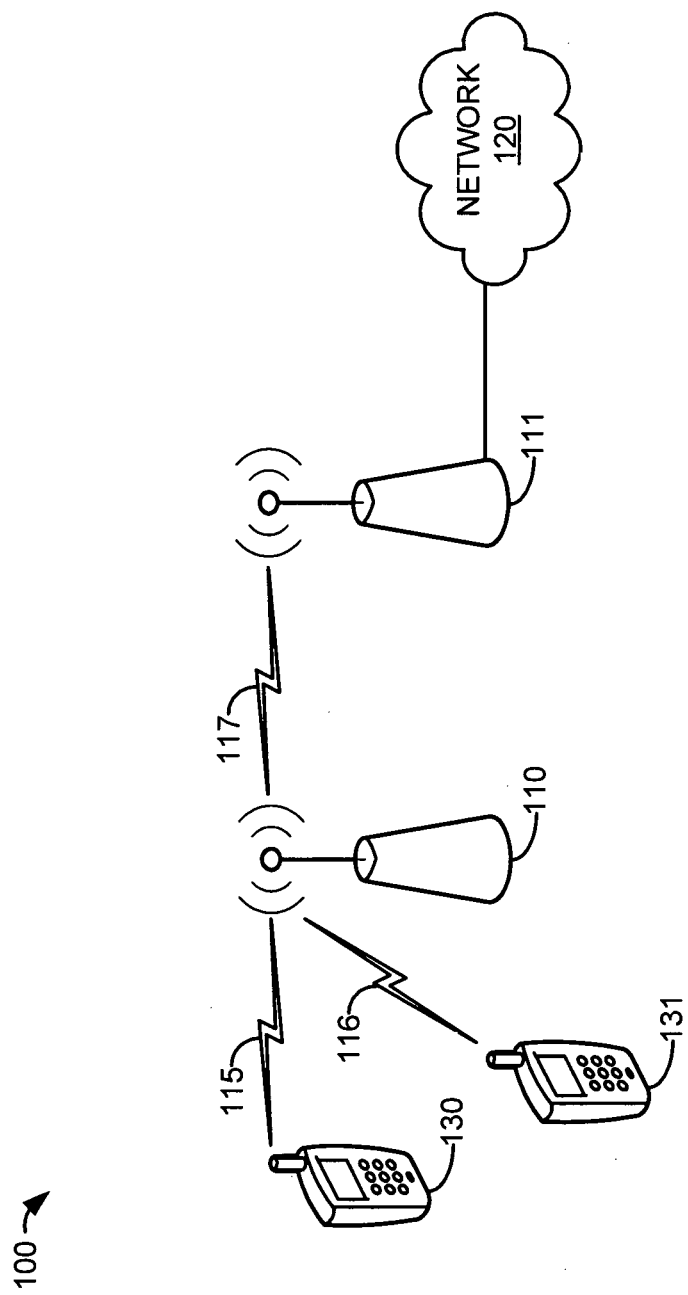
FIG. 1 is a block diagram illustrating a communication system.

FIG. 1 is a block diagram illustrating a communication system. In FIG. 1, communication system 100 comprises: satellite base station 110; central base station 111; network 120; wireless device 130; and, wireless device 131. Wireless device 130 is operatively coupled to satellite base station 110 via wireless link 115. Wireless device 131 is operatively coupled to satellite base station 110 via wireless link 116. Satellite base station 110 is operatively coupled to central base station 111 via wireless link 117. Central base station 111 is operatively coupled to network 120. Thus, wireless devices 130 and 131 are operatively coupled to network 120 via wireless link 115 and 116, respectively, satellite base station 110, wireless link 117, and central base station 111.

Satellite base station 110 may be any wireless system that provides an air interface to wireless devices 130 and 131 and an in-band backhaul link to central base station 111. Central base station 111 may be any wireless system that provides a wireless in-band backhaul link to satellite base station 110 and is operatively coupled to network 120. Examples of satellite base station 110 or central base station 111 include, base transceiver stations (BTSs), radio base stations (RBSs), Node B, enhanced Node B (eNBs) and others. Satellite base station 110 or central base station 111 may include a number of elements known to those skilled in the art comprising a transceiver, power amplifier, combiner, duplexer, antenna and control function.

Wireless device 130 or wireless device 131 may be any device, system, combination of devices, or other such communication platform capable of communicating wirelessly with base station 110. Wireless device 130 or wireless device 131 may be, for example, an a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with network 120 via satellite base station 110. Other types of communication platforms are possible.

Network 120 may be any network or collection of networks that couple, link, or otherwise operatively connect wireless device 130 and wireless device 131 with each other or other devices or systems. Network 120 may include other secondary data networks. In an example, network 120 may include a backhaul network, a local network, a long distance network, or a packet network, or any combination thereof, as well as other types of networks. In an example, communication network 120 may be, or include all or parts of an IEEE 802.16 (WiMAX) specified system. These parts may include other base stations (BSs); an access services network (ASN); or connectivity service network (CSN).

In an embodiment, communication system 100 may utilize a technique called in-band backhaul or self-backhaul. In-band backhaul dedicates a portion of the air interface resources (i.e., allocations of frequency and time called slots) in a frame to backhauling traffic from satellite cells thus eliminating the cost of providing dedicated landline links to these cells. For example, satellite base station 110 may dedicate a portion of its air interface resources in each frame to backhauling traffic to central base station 111. This backhaul traffic, which may be exchanged with wireless device 130 or wireless device 131 via wireless link 115 and wireless link 116, respectively, may be carried by wireless link 117. The portion of the air interface resources not dedicated to backhauling traffic between satellite base station 110 and central base station 111 may be referred to as the access portion of a frame. The portion of the air interface resources dedicated to backhauling traffic between satellite base station 110 and central base station 111 may be referred to as the backhaul portion of a frame.

In an embodiment, satellite base station 110 and central base station 111 may exchange backhaul traffic using a single service flow. Thus, the service flows that satellite base station 110 exchanges with wireless device 130 and wireless device 131 would be multiplexed over this single backhaul service flow for exchange with central base station 111. For example, wireless device 130 may be exchanging a service flow with satellite base station 110 at a quality of service (QoS) level specified by the WiMAX unsolicited grant service (UGS). Wireless device 131 may be exchanging a service flow with satellite base station 110 at a QoS level specified by the WiMAX best-effort service (BE). Both of these service flows would be combined and exchanged between satellite base station 110 and central base station 111 using a single backhaul service flow and thus a single QoS level.

The use of a single backhaul service flow allows satellite base station 110 and central base station 111 to use a semi-static allocation of a number of data structures in each frame. These data structures may be MAC protocol data units (MPDUs). Thus, the size and location of the MPDUs within each frame, or region of each frame, does not change very often. For example, the size and location of the MPDUs may change only every N frames, where N is an arbitrary integer greater than one. In an example, N may be ten (10) or greater. In another example, N may be one hundred (100) or greater. MPDUs may also be referred to herein as bursts. MAC service data units (MSDUs) may then be packed (e.g., fragmented and concatenated) into these semi-static MPDUs.

In an embodiment, satellite base station 110 and central base station 111 may use a reduced MAP control message for the backhaul service flow. This reduces the MAC layer link overhead for the in-band backhaul exchanged between satellite base station 110 and central base station 111. In an embodiment, the reduced MAP control message may be exchanged between satellite base station 110 and central base station 111 using the current modulation and coding scheme for wireless link 117. Thus, the reduced MAP control message may consume fewer air interface resources (e.g., slots) than it would if it were exchanged using a default modulation and coding scheme.

In an embodiment, satellite base station 110 and central base station 111 may periodically (e.g., every N frames, where N>1) exchange information that applies to both the uplink and downlink frames. This information may comprise the number of bursts per frame and the number of slots per burst. Thus, the air interface resources dedicated to backhaul traffic may be comprised of fixed size bursts. The number of bursts per frame may be sent using four (4) bits. This allows there to be a maximum of sixteen (16) bursts in portion of a frame dedicated to exchanging backhaul traffic between satellite base station 110 and central base station 111. The number of slots per burst may be sent using 10 bits. The number of slots per burst is the same for each of the bursts in the backhaul portion of the frame. In an example, N>=10. In another example, N>=100. In another example, N>=1000.

The reduced MAP control message, which is sent in every frame, may comprise information that applies to all the bursts in the backhaul portion of the frame. The reduced MAP control message contains limited information about the backhaul region. This allows the reduced MAP to be smaller than the MAP control message for the access region.

For the downlink portion of the reduced MAP control message, the following information may be sent: (1) a connection identifier (CID) for the first burst; (2) the coding and modulation level; (3) the repetition coding; (4) multiple-input multiple-output antenna (MIMO) information; (5) an A_SN for all of the bursts; and, (6) an acknowledgement (ACK) for each burst that was sent in the uplink direction and was in the backhaul portion of the frame.

The CID for the first burst may be sent using four (4) bits. The CIDs for the rest of the bursts in the backhaul portion are defined to be in sequence (e.g., incrementing or decrementing) after the first burst. The coding and modulation level may be sent using four (4) bits. The repetition coding may be sent using two (2) bits. The MIMO information may be sent using two (2) bits for the matrix type, and two (2) bits for the number of streams. The A_SN for each burst may be sent with a single bit. Thus, to send all of the A_SNs it will take N bits, where N is the number of bursts in the backhaul portion of the frame Likewise, the ACKs for the uplink bursts may be sent with a single bit. Thus, to send all of the ACKs for the uplink bursts it will take N bits.

For the uplink portion of the reduced MAP control message, the following information may be sent: (1) CID for the first burst; (2) the coding and modulation level; (3) the repetition coding; (4) an A_SN for all of the bursts; and, (5) an ACK for each burst sent in the downlink direction that was in the backhaul portion of the frame. The CID for the first burst may be sent using four (4) bits. The CIDs for the rest of the bursts in the backhaul portion are defined to be in sequence (e.g., incrementing or decrementing) after the first burst. The coding and modulation level may be sent using four (4) bits. The repetition coding may be sent using two (2) bits. The A_SN for each burst may be sent with a single bit. Thus, to send all of the A_SNs it will take N bits where N is the number of bursts in the backhaul portion of the frame Likewise, the ACKs for the downlink bursts may be sent with a single bit. Thus, to send all of the ACKs for the downlink bursts it will take N bits.

Satellite base station 110 and central base station 111 both have knowledge of the downlink MAP (DL-MAP) and uplink MAP (UL-MAP) messages in the access part of the frame. Thus, the information in these messages, such as base station identification (BS_ID), physical layer (PHY) synchronization field, DCD count, etc., do not need to be repeated in the reduced MAP control message.

By using the aforementioned reduced MAP, dedicated backhaul region, and single backhaul service flow, the task of scheduling packets for transmission by satellite base station 110 and central base station 111 is simplified. The number of bytes that can be sent in a frame is a function of the number of MPDUs (bursts) and the modulation and coding scheme being utilized for wireless link 117. Satellite base station 110 or central base station 111 determine the number of bytes that can be sent in a single frame based on these parameters. Satellite base station 110 or central base station 111 then choose MSDUs that will occupy that number of bytes. Satellite base station 110 or central base station 111 then schedules the packets to be sent. For service flows that require a minimum bandwidth reservation, satellite base station 110 or central base station 111 may need to adjust the number of slots allocated to these flows when the modulation and coding scheme of wireless link 117 changes.

Note that MSDUs from multiple service flows may be multiplexed together in the same MPDU. This is contrasted with the access portion of the frame where, for WiMAX specified systems, an MPDU is restricted to a single MAC level service flow. Packing headers may be inserted into the MPDUs at appropriate places so that the receiving base station (i.e., satellite base station 110 or central base station 111) may de-multiplex the packet stream.

Figure 2:
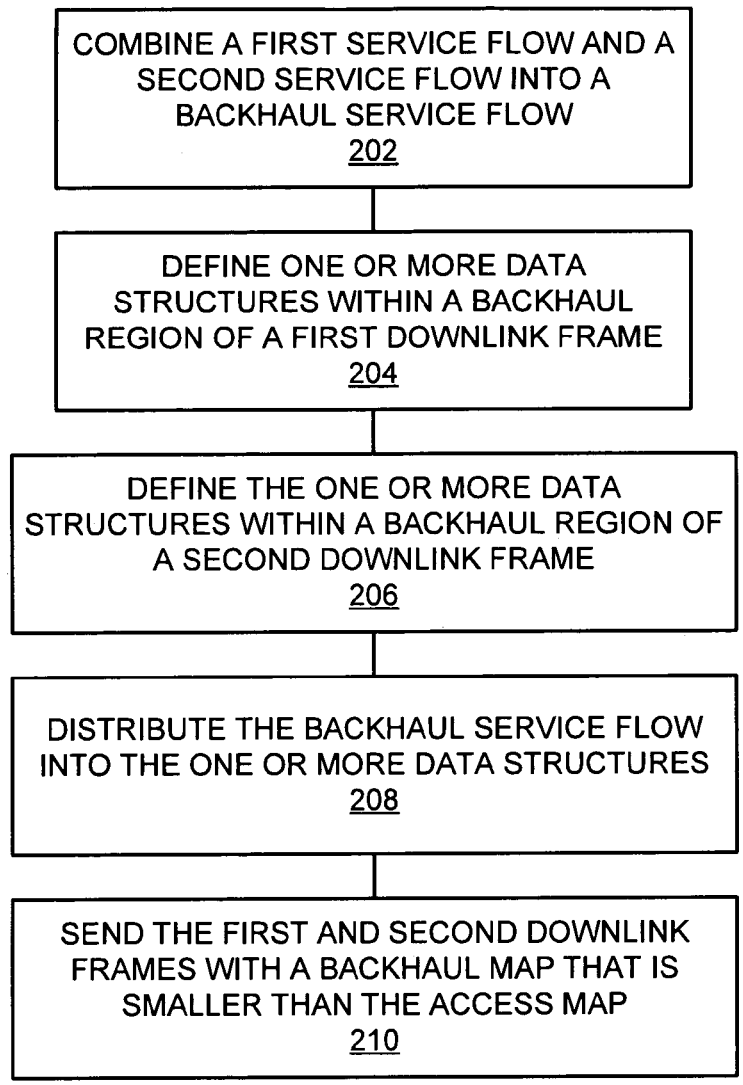
FIG. 2 is a flowchart illustrating a method of operating a media access control (MAC) layer for in-band backhaul of wireless communication.

FIG. 2 is a flowchart illustrating a method of operating a media access control (MAC) layer for in-band backhaul of wireless communication. The steps illustrated in FIG. 2 may be performed by one or more elements of communication system 100. In particular, the steps illustrated in FIG. 2 may be performed by satellite base station 110 or central base station 111.

A first service flow and a second service flow are combined into a backhaul service flow (202). For example, wireless device 130 may be exchanging a service flow with satellite base station 110 at a QoS level specified by the WiMAX unsolicited grant service (UGS). Wireless device 131 may be exchanging a service flow with satellite base station 110 at a QoS level specified by the WiMAX best-effort service (BE). Both of these service flows would be combined and exchanged between satellite base station 110 and central base station 111 using a single backhaul service flow and thus a single QoS level.

One or more data structures are defined within a backhaul region of a first downlink frame (204). For example, satellite base station 110 and central base station 111 may exchange backhaul traffic using a set of dedicated slots in each frame. This set of dedicated slots may be referred to as the backhaul region of a frame. Satellite base station 110 or central base station 111 may also define a set of fixed size bursts or MPDUs within the backhaul region of a frame.

The one or more data structures are defined within the backhaul region of a second downlink frame (206). For example, satellite base station 110 or central base station 111 may define a set of fixed size bursts or MPDUs within the backhaul region of a series of frames.

The backhaul service flow is distributed into the one or more data structures (208). For example, satellite base station 110 or central base station 111 may schedule packets destined to or from wireless device 130 or wireless device 131 into the set of fixed size bursts or MPDUs defined in blocks 204 and 206.

The first and second downlink frames are sent with a backhaul map that is smaller than the access map (210). For example, satellite base station 110 or central base station 111 may exchange frames with an access region and a backhaul region. The backhaul region of these frames may contain a reduced MAP message. This reduced MAP message may be smaller than the standard DL-MAP and UL-MAP sent in the access region of these frames. The reduced MAP message may contain the information described previously in the discussion of FIG. 1.

Figure 3:
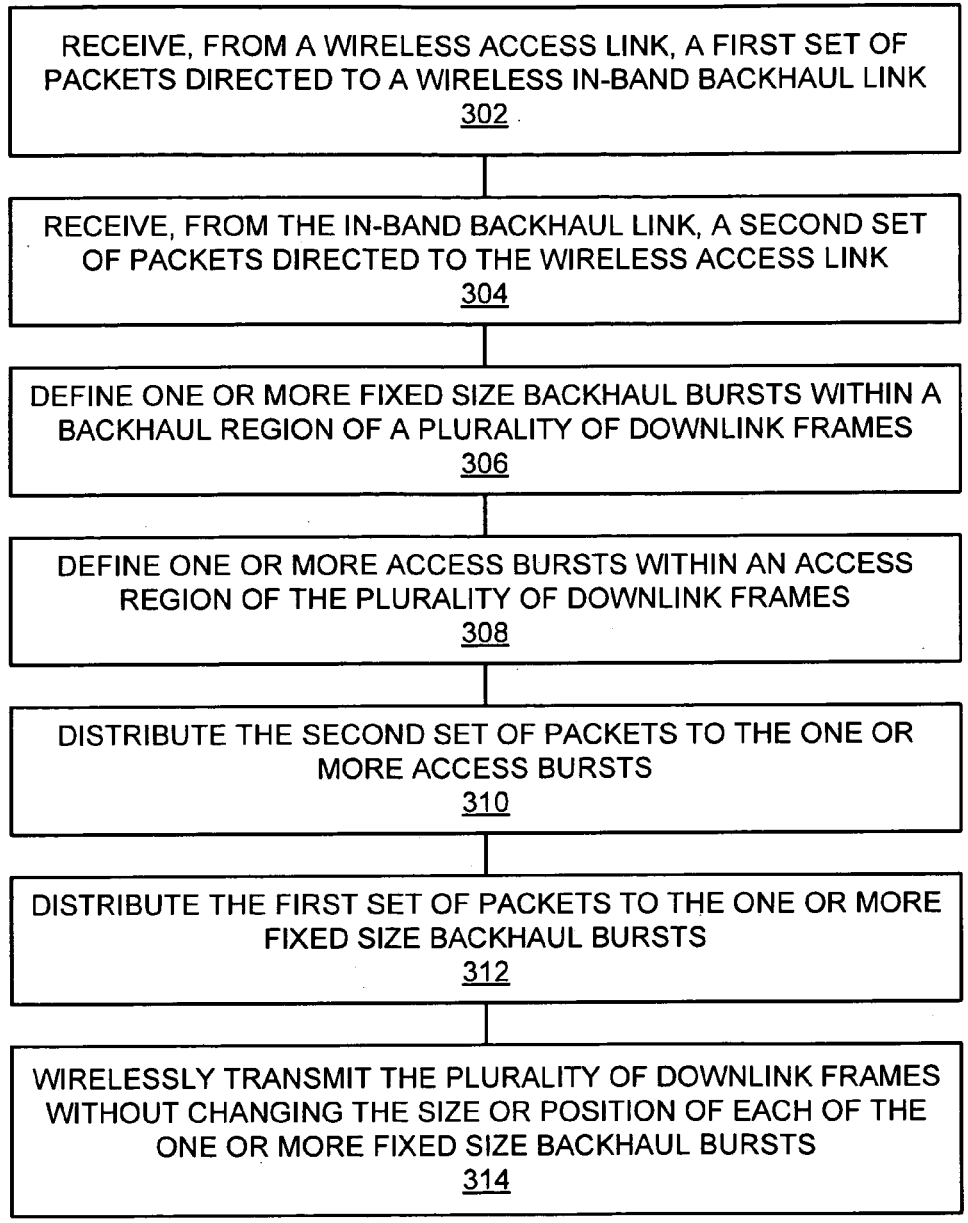
FIG. 3 is a flowchart illustrating a method of operating a wireless communication system.

FIG. 3 is a flowchart illustrating a method of operating a wireless communication system. The steps illustrated in FIG. 3 may be performed by one or more elements of communication system 100. In particular, the steps illustrated in FIG. 3 may be performed by satellite base station 110 or central base station 111.

A first set of packets directed to a wireless in-band backhaul link are received from a wireless access link (302). For example, a first set of packets directed to network 120 may be received by satellite base station 110 from wireless device 130 via wireless link 115. This first set of packets is to be relayed by satellite base station 110 to central base station 111 via wireless link 117.

A second set of packets directed to the wireless access link are received from the in-band backhaul link (304). For example, a second set of packets directed to wireless device 130 may be received by satellite base station 110 from central base station 111. This second set of packets is to be relayed by satellite base station 110 to wireless device 130 via wireless link 115.

One or more fixed size backhaul bursts are defined within a backhaul region of a plurality of downlink frames (306). For example, satellite base station 110 may define a plurality of fixed size MPDUs within a backhaul region of a plurality of downlink frames.

One or more access bursts are defined within an access region of the plurality of downlink frames (308). For example, satellite base station 110 may define a plurality of MPDUs within an access region of the plurality of downlink frames. The MPDUs defined in the access region may have different sizes.

The second set of packets is distributed to the one or more access bursts (310). For example, satellite base station 110 may distribute the second set of packets to the MPDUs defined in block 308. The second set of packets may be distributed to these MPDUs according to a scheduling algorithm that takes the service flow classification and/or QoS associated with each packet into account.

The first set of packets is distributed to the one or more fixed size backhaul bursts (312). For example, satellite base station 110 may distribute the first set of packets to the MPDUs defined in block 306. The first set of packets may be distributed to these MPDUs according to a scheduling algorithm that takes the service flow classification and/or QoS associated with each packet into account.

The plurality of downlink frames are transmitted wirelessly without changing the size or position of each of the one or more fixed size backhaul bursts (314). For example, satellite base station 110 may wirelessly transmit the plurality of frames while keeping the MPDUs in the backhaul region in the same slots from frame to frame. Thus, a reduced size MAP control message may be utilized to describe the contents of the backhaul portion of each frame. In an example, the reduced MAP control message described in the discussion of FIG. 1 may be used. This reduced MAP control message may be sent using the current modulation and coding scheme associated with the backhaul region of the plurality of frames.

Figure 4:
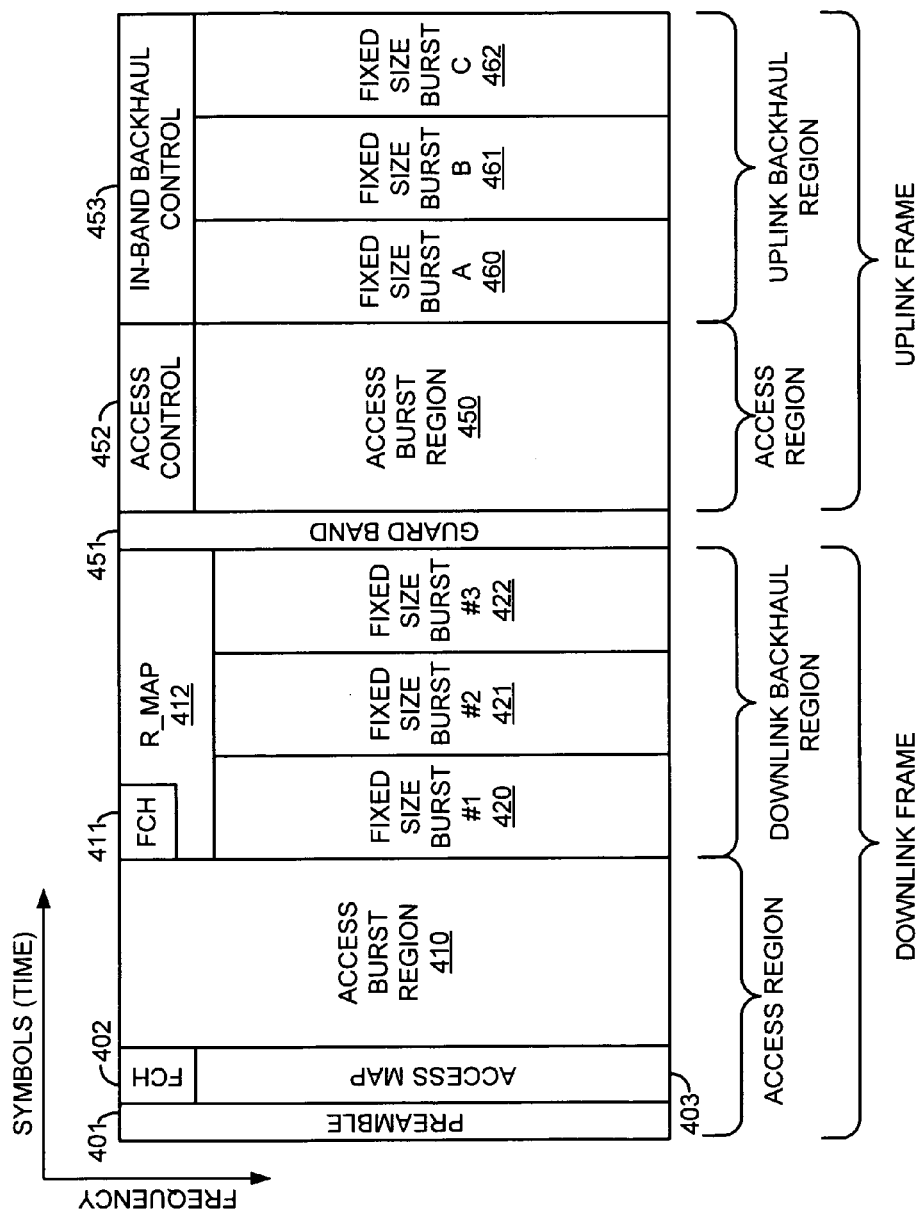
FIG. 4 is an illustration of a downlink frame and an uplink frame with in-band backhaul.

FIG. 4 is an illustration of a downlink frame and an uplink frame with in-band backhaul. The downlink frame and uplink frame illustrated in FIG. 4 may be used by one or more elements of communication system 100. In particular, the downlink and uplink frames illustrated in FIG. 4 may be utilized by satellite base station 110 or central base station 111.

FIG. 4 illustrates a downlink frame and an uplink frame separated by a guard band 451. The downlink frame comprises an access region and a backhaul region. The access region of the downlink frame comprises: preamble 401; frame control header (FCH) 402; access map 403; and, access burst region 410. The backhaul region of the downlink frame comprises: FCH 411; reduced map (R_MAP) 412; fixed size burst #1; fixed size burst #2; and, fixed size burst #3. The uplink frame comprises an access region and a backhaul region. The access region of the uplink frame comprises access control 452 and access burst region 450. The backhaul region of the uplink frame comprises: in-band backhaul control 453; fixed size burst A 460; fixed size burst B 461; and, fixed size burst C 462.

In FIG. 4, reduced map 412 is oriented to occupy slots across a relatively small number of frequency channels and a relatively large number of symbols. This is in contrast to the access map 403 which is oriented to occupy slots across a relatively large number of frequency channels and a relatively small number of symbols. Reduced map 412 may comprise the reduced MAP control message described in the discussion of FIG. 1. Thus, the fixed size bursts 420-422 and 460-462 may be described by this reduced MAP control message Likewise, MSDUs comprising packets coming from, or going to, central base station 111 may be packed into fixed size bursts 460-462, and fixed size bursts 420-422, respectively.

Figure 5:
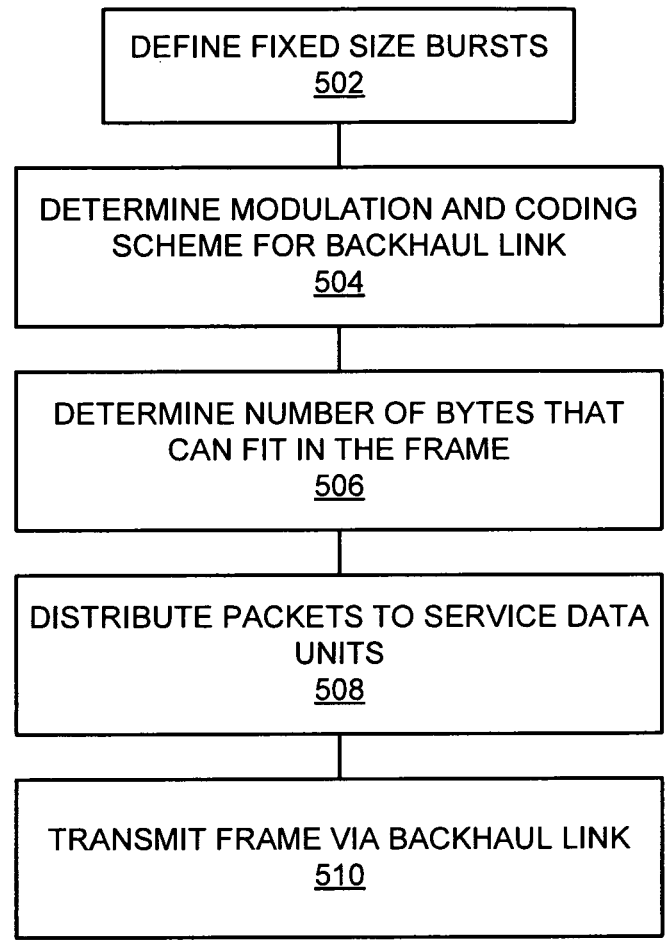
FIG. 5 is a flowchart illustrating a method of scheduling packets on an in-band backhaul link.

FIG. 5 is a flowchart illustrating a method of scheduling packets on an in-band backhaul link. The steps illustrated in FIG. 5 may be performed by one or more elements of communication system 100. In particular, the steps illustrated in FIG. 5 may be performed by satellite base station 110 or central base station 111.

Fixed size bursts are defined (502). For example, satellite base station 110 may define a plurality of MPDUs in a backhaul region of a frame. The modulation and coding scheme for a backhaul link are determined (504). For example, satellite base station 110 may determine which modulation and coding scheme is being utilized during the backhaul portions of the uplink frames received from central base station 111. In another example, satellite base station 110 may determine which modulation and coding scheme is being utilized during the backhaul portions of the downlink frames sent to central base station 111.

The number of bytes that can fit in the frame is determined (506). For example, satellite base station 110 may determine how many bytes can be sent to central base station 111 in a single downlink frame. This determination may be based on the modulation and coding scheme presently being used by wireless link 117 to send data from satellite base station 110 to central base station 111. In another example, central base station 111 may determine how many bytes can be sent to satellite base station 110 in a single uplink frame. This determination may be based on the modulation and coding scheme presently being used by wireless link 117 to send data from central base station 111 to satellite base station 110.

Packets are distributed to service data units (508). For example, satellite base station 110 may distribute packets destined for network 120 via central base station 111 to MSDUs. In another example, central base station 111 may distribute packets destined for wireless device 130 via satellite base station 110 to MSDUs. The MSDUs in both of these examples may be chosen to occupy the number of bytes determined in block 506. Satellite base station 110 or central base station 111 may schedule the packets to be distributed to MSDUs using a scheduling algorithm. This scheduling algorithm may take a QoS classification or service flow classification associated with each packet into account. For service flow classifications that require a minimum bandwidth reservation, satellite base station 110 or central base station 111 may need to adjust the number of slots allocated to these flows when a modulation and coding scheme associated with wireless link 117 changes.

A frame is transmitted via a backhaul link (510). For example, the frame containing the packets distributed in block 508 may be transmitted by satellite base station 110 to central base station 111 via wireless link 117 using a backhaul region of a downlink frame. In another example, the frame containing the packets distributed in block 508 may be transmitted by central base station 111 to satellite base station 110 via wireless link 117 using a backhaul region of an uplink frame.

The methods, systems, devices, networks, and base stations described above may be implemented with, contain, or be executed by one or more computer systems. The methods described above may also be stored on a computer readable medium. Many of the elements of communication network 100 may be, comprise, or include computers systems. This includes, but is not limited to: satellite base station 110; central base station 111; network 120; wireless device 130; and, wireless device 131.

Figure 6:
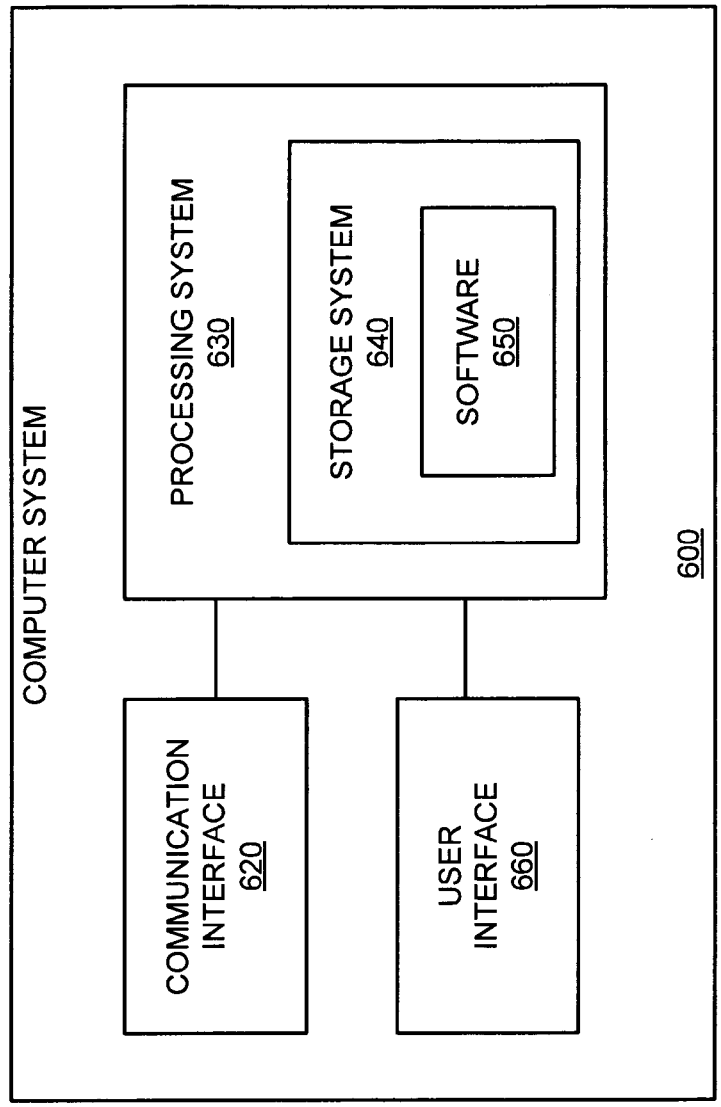
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for in-band backhaul of wireless communication, comprising:
a central base station configured to
receive a first service flow configured to provide a first Quality of Service (QoS) and a second service flow configured to provide a second Quality of Service (QoS);
combine the first service flow and the second service flow into a backhaul service flow configured to provide a backhaul QoS that meets at least the first QoS requirements and the second QoS requirements;
distribute the backhaul service flow into a downlink frame; and
transmit the downlink frame to a satellite base station, wherein the downlink frame comprises an access region and a backhaul region,
the access region comprises an access map configured to define portions of the downlink frame, where the access map is transmitted using a default modulation and coding scheme for transmitting access map data, and
the backhaul region comprises a backhaul map configured to define a plurality of data structures in the backhaul region, where the backhaul service flow is distributed into the plurality of data structures and the backhaul region is transmitted using a modulation and coding scheme based on conditions of the communication link between the central base station and the satellite base station.

2. The system of claim 1, wherein the backhaul map includes a first indicator of a number of the plurality of data structures in the backhaul region and a size for the plurality of data structures.

3. The system of claim 1, wherein the plurality of data structures consist of between two and sixteen data structures.

4. The system of claim 1, wherein a first connection indicator sent in the backhaul map is associated with a first data structure of the plurality of data structures.

5. The system of claim 4, wherein a second connection indicator associated with a second data structure of the plurality of data structures is implied from the first connection indicator.

6. A method of operating a media access control (MAC) layer for in-band backhaul of wireless communication between a central base station and a satellite base station, comprising:
establishing a first service flow between the satellite base station and a first wireless device, wherein the first service flow is configured to provide a first Quality of Service (QoS);
establishing a second service flow between the satellite station and a second wireless device, wherein the second service flow is configured to provide a second QoS;
establishing an in-band backhaul service flow between the central base station and the satellite base station;
configuring, by the central base station, the in-band backhaul service flow to include the first service flow and the second service flow, wherein the in-band backhaul service flow is configured to provide an in-band backhaul QoS that meets at least the first QoS requirements and the second QoS requirements;
defining, by the central base station, a downlink frame comprising an access region and a backhaul region, wherein the access region comprises an access map that defines portions of the downlink frame and the backhaul region comprises a backhaul map that defines portions of the backhaul region;
defining, by the central base station, a plurality of data structures within the backhaul region; and
distributing, by the central base station, the in-band backhaul service flow into the plurality of data structures of the backhaul region, wherein the access map defines the backhaul region as a single service flow, and the backhaul map defines the plurality of data structures of the backhaul region; and
transmitting, by the central base station, a predetermined amount of downlink frames towards the satellite base station, wherein the access map is transmitted using a default modulation and coding scheme for transmitting access map data, and the backhaul portion is transmitted using a modulation and coding scheme based on conditions of the communication link between the central base station and satellite base station.

7. The method of claim 6, wherein the plurality of data structures consist of between two and sixteen data structures.

8. The method of claim 6, wherein the backhaul map comprises a first connection indicator associated with a first data structure of the plurality of data structures.

9. The method of claim 8, wherein a second connection indicator associated with a second data structure of the plurality of data structures is implied from the first connection indicator.

10. The method of claim 9, wherein the second connection indicator is implied from the first connection indicator by incrementing the first connection indicator.

11. The method of claim 6, wherein
each data structure of the plurality of data structures within the backhaul region of the downlink frame comprises a fixed-size burst and carries a predetermined amount of data slots through each downlink frame of the predetermined amount of downlink frames.

12. The method of claim 11, wherein the predetermined amount of downlink frames transmitted towards the satellite base station are transmitted without changing the size and the position of each data structure of the plurality of data structures with respect to the downlink frame, and
the predetermined amount of downlink frames is greater than 10.

13. The method of claim 11, wherein the predetermined amount of downlink frames transmitted towards the satellite base station are transmitted without changing the size and the position of each data structure of the plurality of data structures with respect to the downlink frame, and the predetermined amount of downlink frames is greater than 100.

14. The method of claim 6, wherein each data structure of the plurality of data structures within the backhaul region of the downlink frame comprises a Media Access Control (MAC) Protocol Data Unit, and each service flow of the first service flow and the second service flow is carried on a corresponding MAC Service Data Unit.

15. The method of claim 14, wherein a MAC Protocol Data Unit comprises multiplexed MAC Service Data Units of the first service flow and the second service flow.

* * * * *